United States Patent [19]

Kato

[11] Patent Number: 4,725,190

[45] Date of Patent: Feb. 16, 1988

[54] HAND SYSTEM OF INDUSTRIAL ROBOT

[75] Inventor: Hisao Kato, Aichi, Japan

[73] Assignee: Mitsubishi Denki Kabushiki Kaisha, Japan

[21] Appl. No.: 801,322

[22] Filed: Nov. 25, 1985

[30] Foreign Application Priority Data

Nov. 27, 1984 [JP] Japan .............................. 59-248665
Jan. 11, 1985 [JP] Japan .................................. 60-2229

[51] Int. Cl.⁴ .............................................. B66C 1/00
[52] U.S. Cl. ....................................... 414/730; 901/49
[58] Field of Search ......................... 901/49; 280/618; 414/730; 248/900, 548, 549

[56] References Cited

U.S. PATENT DOCUMENTS

| | | | |
|---|---|---|---|
| 3,874,685 | 4/1975 | von Besser | 280/618 |
| 4,191,395 | 3/1980 | Salomon | 280/618 X |
| 4,293,268 | 10/1981 | Mink | 901/49 X |
| 4,514,616 | 4/1985 | Warner | 901/49 X |
| 4,540,869 | 9/1985 | Yasuoka | 901/49 X |

FOREIGN PATENT DOCUMENTS 0697518 11/1964 Canada .
55-53357 12/1980 Japan .
58-155194 9/1983 Japan .

*Primary Examiner*—Robert J. Spar
*Assistant Examiner*—Jennifer Doyle
*Attorney, Agent, or Firm*—Leydig, Voit & Mayer

[57] ABSTRACT

A robot hand device is provided with a collision protection coupling between a protective plate holding the hand device and a base plate mounted on the robot arm. When the hand device collides against an object in its surroundings, spring biased balls are disengaged from the recesses of a tapered pin of the protective plate by the impact of the collision so that the tapered pin comes away from a tapered hole of the base plate and the protective plate is uncoupled and suspended by a coupling chain to prevent damage.

7 Claims, 14 Drawing Figures

HAND SYSTEM OF INDUSTRIAL ROBOT

BACKGROUND OF THE INVENTION

This invention relates to the safety system of an industrial robot.

In general, in an industrial robot which automatically performs a welding job or a painting job on a product, a traversing job on an article being assembled, or the like, a safety system is provided to prevent the hand device of the robot from causing damage due to an impact, even when the hand device has collided against an object in the surroundings on account of the malfunction of a PCU (central processing unit) or other component when the robot is in a teaching mode or full-automatic operation.

Such a safety system of an industrial robot is known in the prior art, for example, the system described in Japanese Utility Model Registration Application Publication No. 55-53357. A hand device is connected with the free end of the arm of the industrial robot through an L-shaped fixture, the bent portion of which is formed with a groove. When the hand device collides with an object in the surroundings and receives an external force, the L-shaped fixture is cut by a stress concentrated in the groove, and the hand device comes off so as to avoid causing damage. Another safety device is disclosed in U.S. Pat. No. 4,673,329 commonly assigned with the present application.

With the prior-art safety system as described above, the excessive external force to which the hand device is subjected by an impact is avoided by the cutting of the L-shaped fixture. It is difficult to similarly avoid external forces in the horizontal direction and in the vertical direction. Thus, the prior-art system does not function satisfactorily as a safety system of an industrial robot which operates in three dimensions.

SUMMARY OF THE INVENTION:

The present invention provides a safety system of an industrial robot which can readily disconnect a hand device in response to an external force in any direction attributed to an impact, and which has a simple structure.

The safety system of an industrial robot according to this invention is so constructed that a plurality of members are held in snug fit engagement between a robot arm and a hand device through the urging of an arrangement of elements including resilient elements imparting elastic forces on corresponding members. This snug fit engagement is releasable by an impact.

In this invention, the plurality of members is held in snug fit engagement through the above-mentioned arrangement of urging elements comprising spherical bodies biased by elastic forces, thus unitarily connecting the robot arm and the hand device by the snug fit engagement. In the event that the hand device undergoes an external force in any direction due to the collision thereof with an object in the surroundings, the snug fit engagement is readily released to disconnect the hand device.

BRIEF DESCRIPTION OF THE DRAWINGS

FIGS. 1 through 8 illustrate an embodiment of this invention wherein FIG. 1 is a side view of an industrial robot, FIG. 2 is an enlarged bottom view of a protection device to which a hand device is attached, FIG. 3 is an enlarged vertical sectional view of the protection device, FIG. 4 is a sectional view taken along line IV—IV in FIG. 3, and FIGS. 5 through 8 are views for explaining the operation of the protection device.

Figure 1:
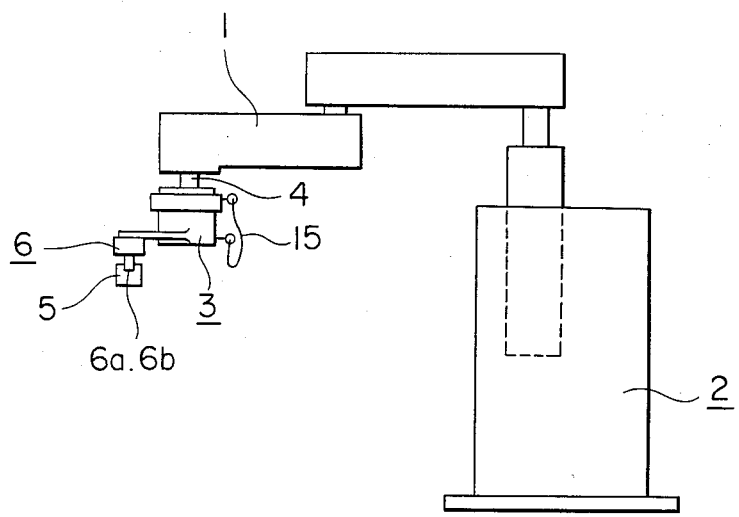
Figure 2:
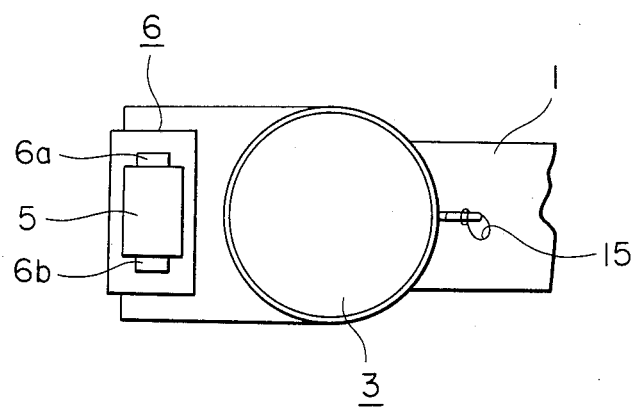

DESCRIPTION OF THE PREFERRED EMBODIMENTS:

FIGS. 1 through 8 illustrate one embodiment of this invention. In FIG. 1, numeral 1 designates an arm which is movably mounted on an industrial robot 2. Numeral 3 designates a protection device which is attached to the free end of the arm 1 through a control shaft 4. Mounted on this protection device 3 is a hand device 6 which, as also shown in FIG. 2, has a pair of grip claws 6a and 6b that grasp a workpiece 5 from both sides or release it.

Figure 3:
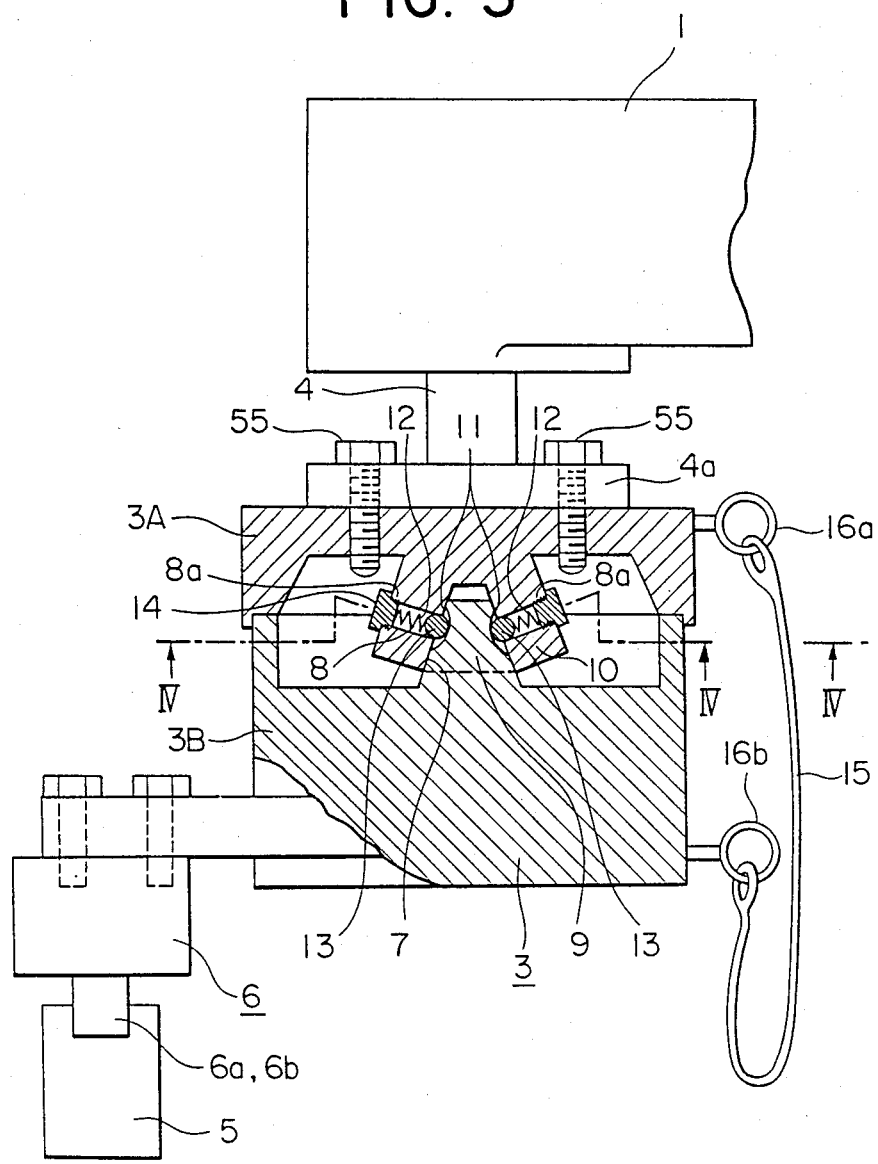
Figure 4:
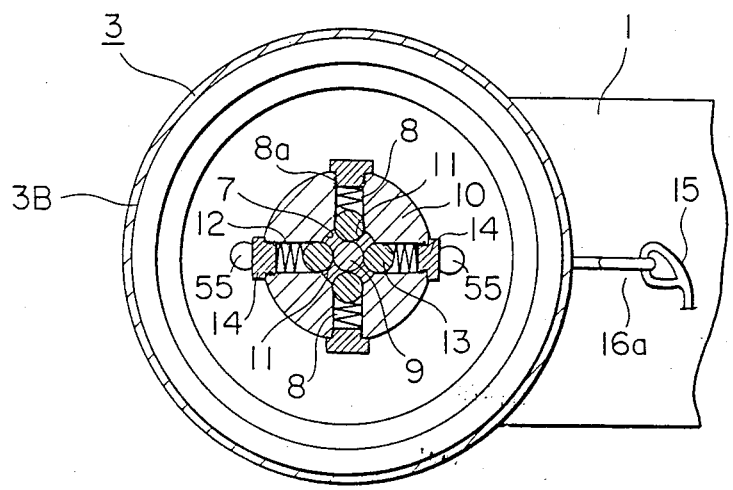

Referring now to FIGS. 3 and 4, symbol 3A denotes a support means, herein shown as a base plate of the protection device 3 which is fixed by a plurality of anchor bolts 55 to a flange portion 4a integral with the control shaft 4 of the arm 1. A boss portion 10, which is formed substantially centrally of the bottom of the base plate 3A, is provided with a supporting portion spaced peripherally in a ring and defining a tapered hole 7 flaring downwardsd. Coupling assemblies are mounted in a plurality of through holes 8 in the support means extending radially in the shape of a cross in the boss portion 10 so as to extend toward the tapered hole 7 and the outer end parts of which are formed with internal threads 8a. Symbol 3B denotes a hand device holding means to which the hand device 6 is attached, herein shown as a protection plate of the protection device 3 which has engaging portions disengageably abutting the supporting portions in the form of a tapered pin 9 detachably inserted in the tapered hole 7 formed centrally of the bottom of the base plate 3A and to which the hand device 6 is attached. To provide a coupling means between the supporting portions provided by the tapered hole and the engaging portions provided by the tapered pin, the outer peripheral surface of the tapered pin 9 has a plurality of curved recesses 11 at its positions corresponding to the respective through holes 8. The coupling means includes plastic force imparting means in the form of compression springs 12 and spherical bodies, herein shown as balls 13, inserted in the respective through holes 8 into engagement with corresponding recesses 11 under a predetermined pressure so as to retain the protective plate 3B by means of the base plate 3A. The outer end of each of the compression springs 12 is fixed by a setscrew 14 which is inserted in the internal thread 8a of the through hole 8. Shown at numeral 15 is a coupling chain which is joined at both its ends to coupling rings 16a and 16b respectively mounted on the base plate 3A and protective plate 3B of the protection device 3.

Figure 5:
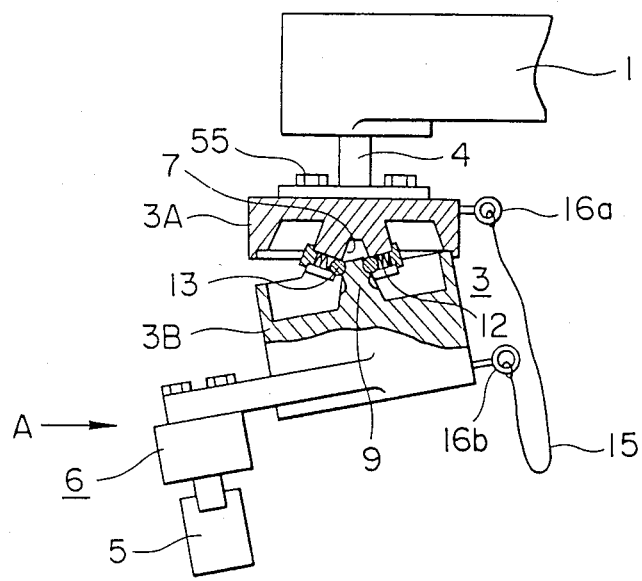
Figure 6:
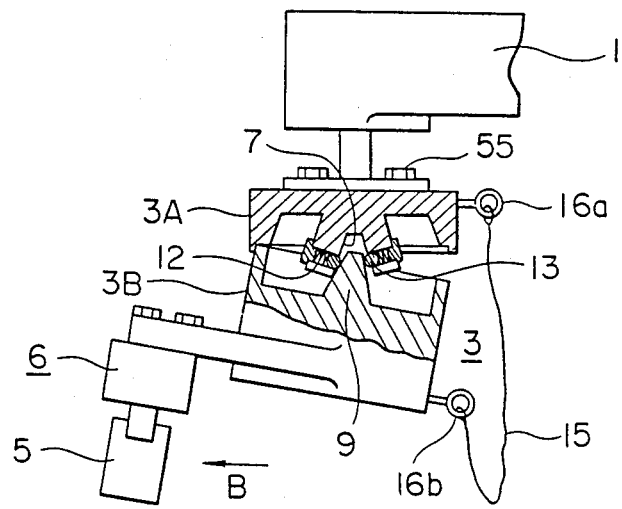
Figure 7:
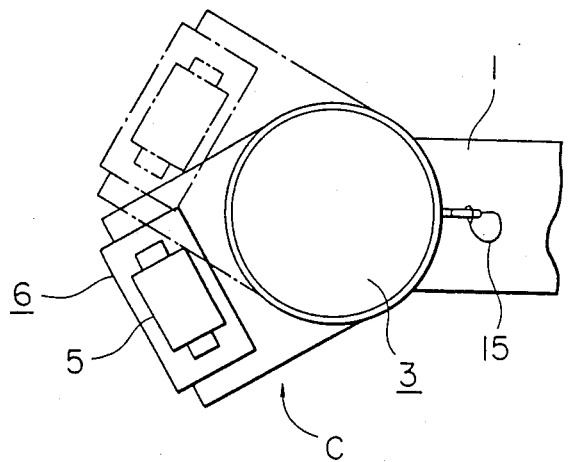
Figure 8:
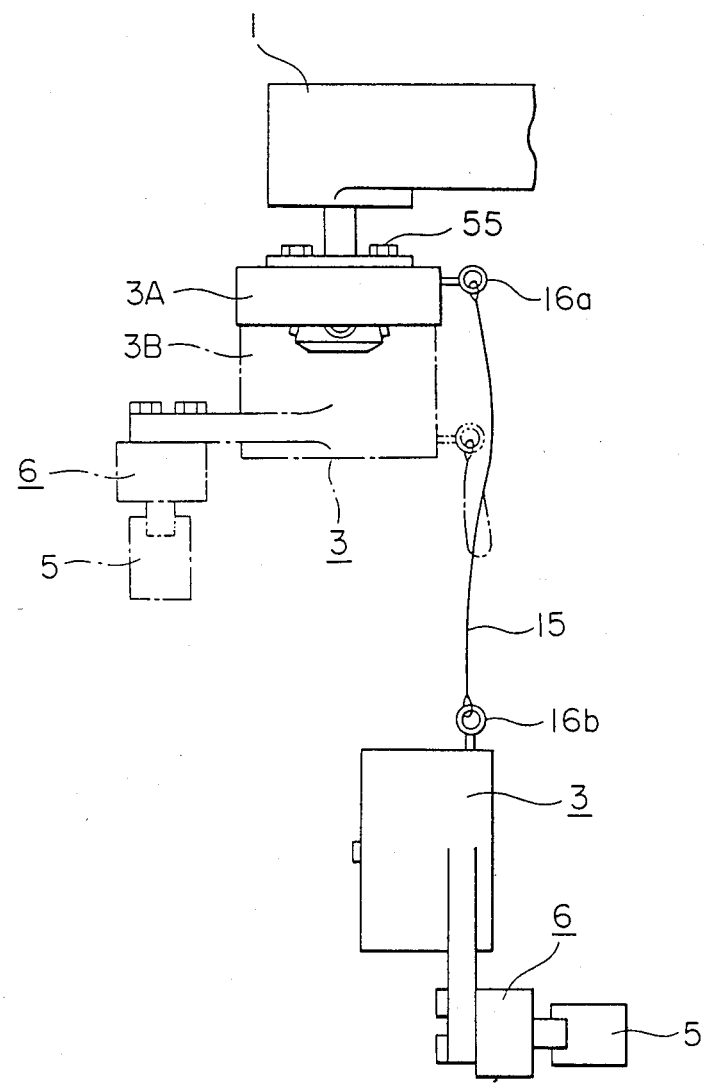

The hand system of the industrial robot according to this invention is constructed as described above. Therefore, while the hand device 6 is smoothly performing a predetermined job, the balls 13 are snugly fitted in the recesses 11 of the tapered pin 9 of the protective plate 3B under the predetermined pressure by the compression springs 12 as shown in FIGS. 3 and 4, and, hence, the protective plate 3B and the base plate 3A are unitarily connected to allow the hand device 6 to conduct a predetermined operation. In contrast, when the hand device 6 has collided against an object in the surroundings on account of a malfunction and undergoes an impact in the direction of an arrow A from the front, as shown in FIG. 5, undergoes an impact in the direction of an arrow B from the rear, as shown in FIG. 6, or undergoes an impact in the direction of an arrow C from a side, as shown in FIG. 7, the balls 13 are disengaged from the recesses 11 of the tapered pin 9 of the protective plate 3B by the impact, as shown in FIG. 5 or FIG. 6. Consequently, the tapered pin 9 comes away from the tapered hole 7 of the base plate 3A, and the protective plate 3B is uncoupled from the robot along with the hand device 6 and is suspended by the coupling chain 15, as shown in FIG. 8, thereby preventing damage of the hand device 6 from the impact. The protective plate 3B, having been uncoupled, is restored in place on the base plate 3A by inserting the tapered pin 9 thereof into the tapered hole 7 of the base plate 3A and snugly fitting the balls 13 into the recesses 11 of the tapered pin 9.

Even when the balls 13 are assembled in the tapered pin 9 of the protective plate 3B and the recesses 11 are provided in the tapered hole 7 of the base plate 3A to snugly receive the balls 13 therein, a similar functional effect is achieved.

As described above, with the hand system of an industrial robot according to this invention, when a hand device 6 has collided against an object in the surroundings on account of a malfunction, balls 13 are disengaged from the recesses 11 of the tapered pin 9 of a protective plate 3B by the impact of the collision, so that the tapered pin 9 comes away from the tapered hole 7 of a base plate 3A and the protective plate 3B is uncoupled along with the hand device 6 and is suspended by a coupling chain 15. Thus, damage of the hand device 6 attributed to the impact can be avoided.

Figure 9:
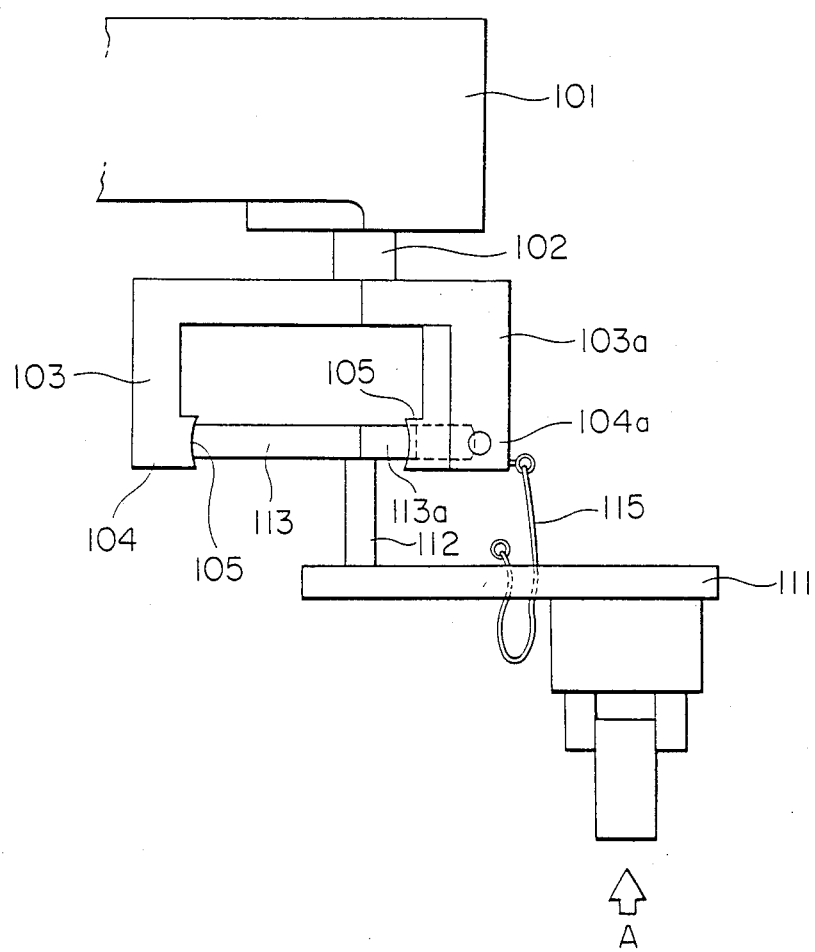
FIG. 9 is a side view showing another embodiment of this invention.
Figure 10:
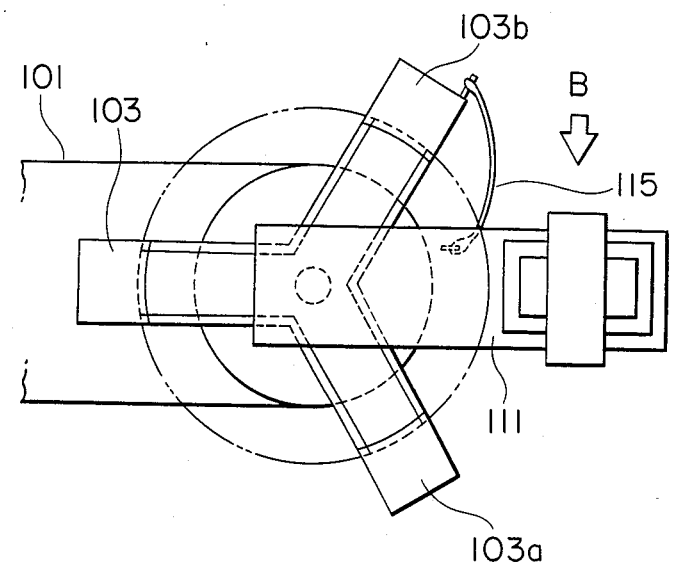
FIG. 10 is a bottom view of the embodiment.

FIG. 9 is a side view showing another embodiment of this invention, while FIG. 10 is a bottom view of this embodiment. Referring to these figures, numeral 101 designates an arm of an industrial robot and numeral 102 a rotary drive or control shaft which is provided at the free end of the arm 101. In this embodiment, supporting portions are carried by supporting arms 103, 103a, and 103b disposed at the lower end of the rotary drive or control shaft 12 at intervals of 120°. The supporting portions are respectively provided at front end parts of holders 104, 104a, and 104b at the lower extremities of the supporting arms 103, 103a.

Figure 11:
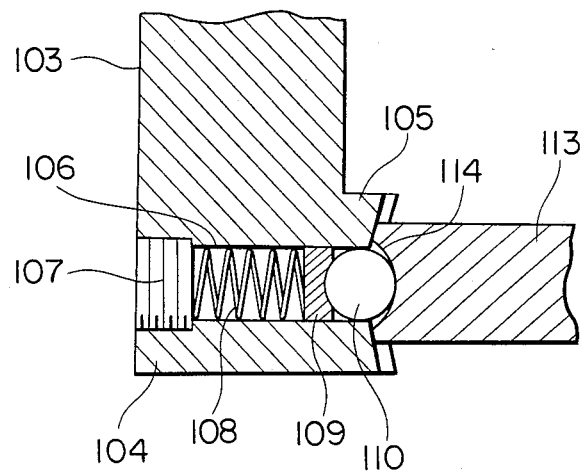
FIG. 11 is an enlarged side sectional view of a holder which is the essention portion of the embodiment.

FIG. 11 is an enlarged sectional view of the holder 104. A curved supporting portion 105 is formed on the inner side of the lower part of the supporting arm 103, a coupling assembly is mounted in a hole 106 which penetrates this lower part in the horizontal direction substantially centrally of the curve, the outer opening of the hole 106 is closed with a blind screw 107 which abuts a compression spring 108 inserted in the hole 106, and the compression spring 108 presses a spherical body 110 received in the inner opening of the hole 106 through a pressing seat 109.

The curved inner openings of the holders 104, 140a, and 104b thus formed are all located on the same radius of curvature around the rotary drive or control shaft 102 and are spaced in a ring 120° apart and concentric with the control shaft.

Hand device holding means having through pieces 113, 113a, and 113b, which are respectively held in engagement with the holers 104, 104a, and 104b, are disposed at the upper end of a shaft 112 with which a hand device 111 is furnished and extend radially at intervals of 120° corresponding to the supporting arms 103, 103a, and 103b. The front ends of the respective pieces 113, 113a, and 113b are located so as to substantially abut on the inner openings of the corresponding holes 104, 104a, and 104b. As shown in FIG. 11 concerning the case of the supporting arm 102, the front end part of the piece 113 is formed with a conical recess 114 and is held in snug engagement with the holder 104 through the spherical body 110. The structure of FIG. 11 applies also to the other supporting arms 103a and 103b. Thus, the engagement of the holders 104, 104a, and 104b and the corresponding pieces 113, 113a, and 113b connects the hand device 111 and the robot arm 101 unitarily owing to the elastic forces of the compression springs 108. Numeral 115 desingates a coupling chain which joins the supporting arm assembly and the hand device 111 as best shown in FIG. 9.

As in conventional industrial robots, the hand device 111 is provided with grip claws for grasping a workpiece and a grip unit for controlling and actuating the grip claws.

Figure 12:
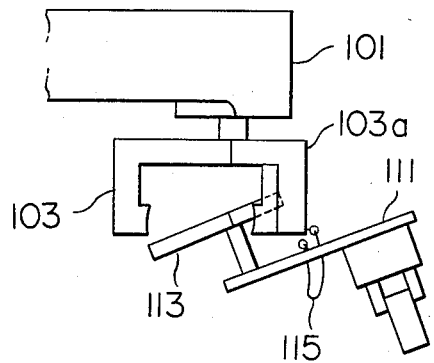
FIGS. 12 through 14 are views for explaining operations.
Figure 13:
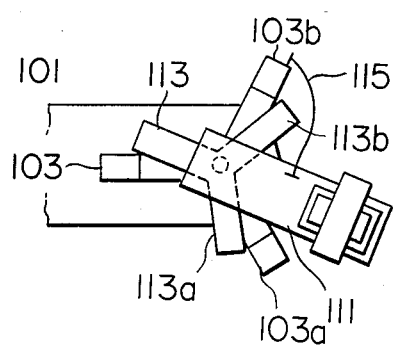
Figure 14:
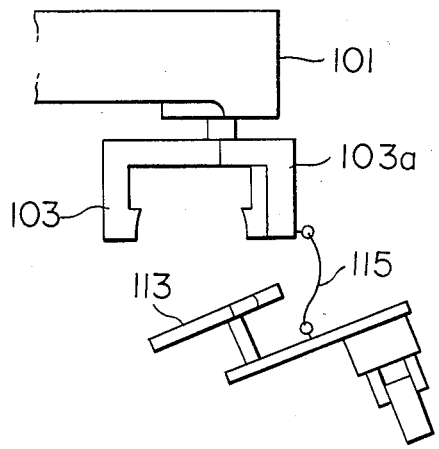

With the safety device of an industrial robot constructed as described above, during ordinary operation this hand device 111 is unitarily connected with the robot arm 101 through the safety device, as shown in FIGS. 9–11. However, when the hand device 111 has collided against an object in the surroundings and has undergone an external force from below, as indicated by an arrow A in FIG. 9, the engagement of the safety device is partly released, as shown in FIG. 12, and subsequently the hand device holding means pivots relative to the supporting plane and the whole hand device 111 is released and is suspended by the coupling chain 115, as shown in FIG. 14. In addition, when the hand device 111 has undergone an external force laterally, as indicated by an arrow B in FIG. 10, the fit engagement of the safety device is entirely released, as shown in FIG. 13, and the hand device 111 falls and is suspended by the coupling chain 115, as shown in FIG. 14.

Although this embodiment has exemplified the case where the supporting arms 103, 103a, and 103b are bent at right angles and where the lower parts of the vertical portions of the bent structures are provided with the holders 104, 104a, and 104b, the supporting arms may well be bent at angles different from the right angles, or the lateral portions of the bent structures may well be provided with the holders. Alternatively, inclined rectilinear supporting arms may well be directly attached to the rotary driving shaft 102. Further, the snug fit pieces 113, 113a, and 113b need not be of the structure in which the rectangular members are centrally joined as in the embodiment but may well be made up of a circular member, a rectangular member when viewed in plan, or the like, the outer side of which is provided with the protrusions 105 whose end faces are formed with the conical recesses 114. Still further, the coupling chain 115 may have its one end joined to any place of the supporting arm assembly, and it may well have its other end joined to the opposite end of the hand device 111 with respect to the shaft 112.

According to the second embodiment of this invention, members are held in engagement through the urging of an arrangement of elements including resilient elements imparting elastic forces to corresponding members to bring forth the effect that a safety device becomes a simplified and miniaturized mechanism and that regardless of the direction in which an abnormal external force is undergone due to a collision, the engagement is released to disconnect a hand device and to avoid the occurrence of damages.

What is claimed is:

1. A hand system of an industrial robot having a robot arm, a control shaft provided at a free end of said robot arm, a hand device which has grip claws for grasping a workpiece, and a protection device, capable of disconnecting said hand device due to an impact, interposed between said hand device and said control shaft, said protection device comprising:

support means comprising three supporting arms extending from said control shaft in three directions, each arm having front end parts respectively formed with a supporting portion, hand device holding means having three engaging portions extending in three directions so as to correspond to said supporting arms and engaging said supporting portions, respectively, with a snug fit so as to support said holding means, and coupling means disposed between said supporting portions of said supporting arms and said engaging portions of said holding means, respectively, including elastic force imparting means and spherical bodies carried by one of said portions and urged by said elastic force imparting means against the other portions, thereby to couple said supporting portions and said engaging portions elastically and disengageably.

2. A hand system according to claim 1 wherein means are provided for adjusting the force applied to the spherical bodies by said elastic force imparting means.

3. A hand device of an industrial robot having a robot arm, a control shaft provided at a free end of said robot arm, a hand device which has grip claws for grasping a workpiece, and a protection device, capable of disconnecting said hand device due to an impact, interposed between said hand device and said control shaft, said protection device comprising:

(a) support means carried by said control shaft having a ring of supporting portions arranged concentric with said control shaft;

(b) hand device holding means connected to said support means to support said hand device, said holding means having a ring of engaging portions disengageably abutting said supporting portions and having a snug fit therein;

said ring of supporting portions and said ring of engaging portions lying generally in and defining a supporting plane when in an operating position; and (c) coupling means disposed between said supporting portions and said engaging portions to retain said portions in said supporting plane when in the operating position, said coupling means comprising at least three assemblies extending in at least three directions radially from the axis of said control shaft, each assembly having an elastic force imparting means and a spherical body, and at least three recesses, each recess being provided for receiving a spherical body of one of said assemblies, the elastic force imparting means urging the spherical bodies into the recesses, thereby to couple said supporting portions and said engaging portions elastically and disengageably and allowing said engaging portions to separate from said supporting portions and said hand device holding means to pivot out of said supporting plane and release from said support means due to impact.

4. A hand device system according to claim 3 wherein said ring of supporting portions of said support means define a tapered hole axially aligned with said control shaft, said ring of engaging portions of said hand device holding means define a tapered pin disengagably inserted in said tapered hole and having a snug fit therein, said at least three assemblies are mounted in holes in said pin, and said at least three recesses are provided in said tapered hole, each recess being provided for receiving a spherical body of one of said assemblies in said pin.

5. A hand device system according to claim 3 wherein said ring of supporting portions are formed on three supporting arms extending from said control shaft in three directions, each arm having front end parts respectively formed with a supporting portion, said ring of engaging portions are formed on said hand device holding means and extend in three directions so as to correspond to said supporting arms, said engaging portions engaging said supporting portions, respectively, with a snug fit, and said coupling means are disposed between said supporting portions of said supporting arms and said engaging portions of said holding means, thereby to couple said supporting portions and said engaging portions elastically and disengageably.

6. A hand device system according to claim 5 wherein said three supporting arms have supporting portions arranged at locations spaced 120 degrees apart, and said hand device holding means has three radially extending arms located 120 degrees apart and corresponding to said supporting arms, respectively, and having engaging portions at outer ends of said radially extending arms engaging said supporting portions.

7. A hand device of an industrial robot having a robot arm, a control shaft provided at a free end of said robot arm, a hand device which has grip claws for grasping a workpiece, and a protection device, capable of disconnecting said hand device due to an impact, interposed between said hand device and said control shaft, said protection device comprising:

(a) support means carried by said control shaft having a ring of supporting portions defining a tapered hole axially aligned with said control shaft, (b) hand device holding means connected to said support means to support said hand device, said holding means having a ring of engaging portions defining a tapered pin disengageably inserted in said tapered hole and having a snug fit therein, said support means further including a supporting member providing an annular support surface concentric with the axis of said tapered hole, said hand device holding means further having a peripheral portion abutting the annular support surface of said support means when said tapered pin of said hand device holding means is received within said tapered hole of said support means with a snug fit, said ring of supporting portions and said ring of engaging portions lying generally in and defining a supporting plane when in an operating position, and (c) coupling means disposed between said tapered hole of said supporting portion and said tapered pin of said engaging portion, said coupling means comprising at least three assemblies extending in at least three directions radially from the axis of said tapered hole, each assembly having an elastic force imparting means and a spherical body, and at least three recesses, each recess being provided for receiving a spherical body of one of said assemblies, the elastic force imparting means urging the spherical bodies into the recesses, thereby to couple said tapered pin and tapered hole elastically and disengageably and allowing said engaging portions to separate from said supporting portions and said hand device holding means to pivot out of said supporting plane and release from said support means due to an impact.

* * * * *